US007882240B2

(12) United States Patent
Dickens et al.

(10) Patent No.: US 7,882,240 B2
(45) Date of Patent: Feb. 1, 2011

(54) DISCONNECTING SELECTED PARTICIPANT IN MULTICAST SESSION

(75) Inventors: C. Scott Dickens, Issaquah, WA (US); Asad Yaqoob, Redmond, WA (US); Saad Syed, Redmond, WA (US); Jeremy Sadler, Seattle, WA (US); Alaa Abdelhalim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/824,890

(22) Filed: Jul. 3, 2007

(65) Prior Publication Data

US 2009/0013079 A1 Jan. 8, 2009

(51) Int. Cl.
*G06F 15/16* (2006.01)

(52) U.S. Cl. .................. 709/227; 370/230; 370/235

(58) Field of Classification Search ............. 709/237, 709/241, 220, 227; 370/229, 236, 231, 237, 370/235, 230; 714/820
See application file for complete search history.

(56) References Cited

U.S. PATENT DOCUMENTS

| | | | |
|---|---|---|---|
| 6,269,085 B1 | 7/2001 | Provino et al. | |
| 6,427,166 B1 | 7/2002 | Hurst et al. | |
| 6,526,022 B1 * | 2/2003 | Chiu et al. | 370/229 |
| 6,577,599 B1 * | 6/2003 | Gupta et al. | 370/236 |
| 6,594,798 B1 * | 7/2003 | Chou et al. | 714/820 |
| 6,693,907 B1 | 2/2004 | Wesley et al. | |
| 6,904,464 B1 * | 6/2005 | Van Langen et al. | 709/237 |
| 7,035,214 B1 * | 4/2006 | Seddigh et al. | 370/231 |
| 7,206,811 B2 | 4/2007 | Skurikhin et al. | |
| 7,227,843 B2 * | 6/2007 | Belanger et al. | 370/237 |
| 7,355,975 B2 * | 4/2008 | Liu et al. | 370/235 |
| 2004/0267960 A1 | 12/2004 | Riedle | |

OTHER PUBLICATIONS

Chiu, et al.,"Pruning Algorithms for Multicast Flow Control", Sun Microsystems Laboratories, Burlington MA Jun. 2000.
Chiu, et al., "TRAM: A Tree-based Reliable Multicast Protocol", Sun Microsystems Laboratories, of Sun Microsystems, Inc., USA, Jul. 1998.
Khanna, et al., "Failure Handling in a Reliable Multicast Protocol for Improving Buffer Utilization and Accommodating Heterogeneous Receivers", PRDC, pp. 15-24, 10th Pacific Rim International Symposium on Dependable Computing (PRDC'04), 2004.
H. S. Shim, R. Hall, R. Litiu, and A. Prakash, "Stateful Multicast Services for Supporting Collaborative Applications", CSE-TR-351-97, Department of EECS, University of Michigan, Nov. 1997.

* cited by examiner

*Primary Examiner*—Jungwon Chang

(57) ABSTRACT

A slow client that participates in a reliable multicast session may reduce the speed of data transfer for other clients in the session. A multicast server can mitigate the effect of a slow client by identifying and disconnecting one or more clients that are slowing down the session, or by using other criteria to identify clients to be disconnected. The server may monitor the performance of clients in the session based on factors such as the rate at which each of the clients is able to receive data, the number or rate of packets lost by a client, the amount of time that a client has spent as the slowest client in the session, the identity of a particular client, etc. A client that has been identified for disconnection based on the server's detection efforts, or that has been identified by an administrator, may be disconnected.

20 Claims, 4 Drawing Sheets

DISCONNECTING SELECTED PARTICIPANT IN MULTICAST SESSION

BACKGROUND

In a multicast session, data is transmitted concurrently to a plurality of participants. Typically, a multicast server writes a packet of data out to the network, and the packet is then received by the various participants in the multicast session.

In a reliable multicast, the dropping of a packet is detected and remedied by retransmission of the packet. Since packets are transmitted concurrently to the various participants in the session, if one participant cannot keep up with the same rate of data transfer as the other participant, then the server either takes time to retransmit the packet, or else slows down the rate of transmission for the session to allow the slow participant to keep up. Thus, when one participant in a multicast session is slow, the speed of transmission to the other participants suffers. In effect, the slow participant becomes the "weakest link in the chain."

SUMMARY

In a multicast session, the speed of data transmission can be improved by detecting slow participants and disconnecting them from the session. While data is being transmitted in a multicast session, a component at the multicast server monitors the speed of, or other information about, the various participants. A participant can be identified that has been found to be slow, that is predicted to be slow, or that meets certain other criteria, and the server can initiate the disconnection of that identified participant from the session. Additionally, an administrator, or other user or operator of the server, can manually direct that a particular participant be disconnected.

Criteria for detecting and disconnecting a slow participant may include such factors as: the number or frequency of negative acknowledgments received from a participant; the amount of time that a participant has spent as the slowest participant in the session, the number or proportion of packets that a particular participant has dropped, the identity of the participant (and its known history of slowing down a session), processor utilization, memory pressure, network utilization, etc.

When a slow participant (or a participant identified for reasons other than slowness) is disconnected, then the transmission of data to that participant may fail. Or, the server may attempt to transmit the data to the participant in some way that does not slow down the other participants in the session—e.g., by initiating a unicast with the participant outside of the multicast session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A multicast session transfers data concurrently to a plurality of clients (or other participants). Multicasts, and other types of network transmissions, can be classified as reliable or non-reliable. In a non-reliable transmission, a participant's failure to receive a piece of the transmission (e.g., the dropping of a packet) may be ignored by the transmission protocol. Non-reliable transmission may be appropriate in situations where the loss of data is acceptable, such as real-time transmission of audio, real-time transmission of video, etc. Reliable transmissions may be used in cases where the loss of data is not acceptable. Distribution of software or a software update (e.g., a security patch or hotfix) is an example of a situation where data loss may be unacceptable, and where reliable transmission may be used.

Reliable multicast may be accomplished by transmitting data at a rate that allows the various clients in the session to "keep up" with the data transmission. The rate at which clients can keep up may be determined by obtaining feedback from one or more clients in the multicast session in order to determine how fast those clients are able to receive data. Under this method, however, a client that receives data slowly can slow down the entire transmission for other clients in the session. In effect, the slowest client sets the pace for the other clients. Allowing a server to disconnect a client that has been identified as slow (or a client that has been identified for other reason) can prevent the identified client from slowing down the entire transmission for other faster clients. Similarly, allowing an administrator, or other operator, to use the server interface to direct that a client be disconnected (e.g., based on the operator's judgment that the client is too slow) can likewise prevent that client from slowing down the entire transmission.

Example Multicast Arrangement

Figure 1:
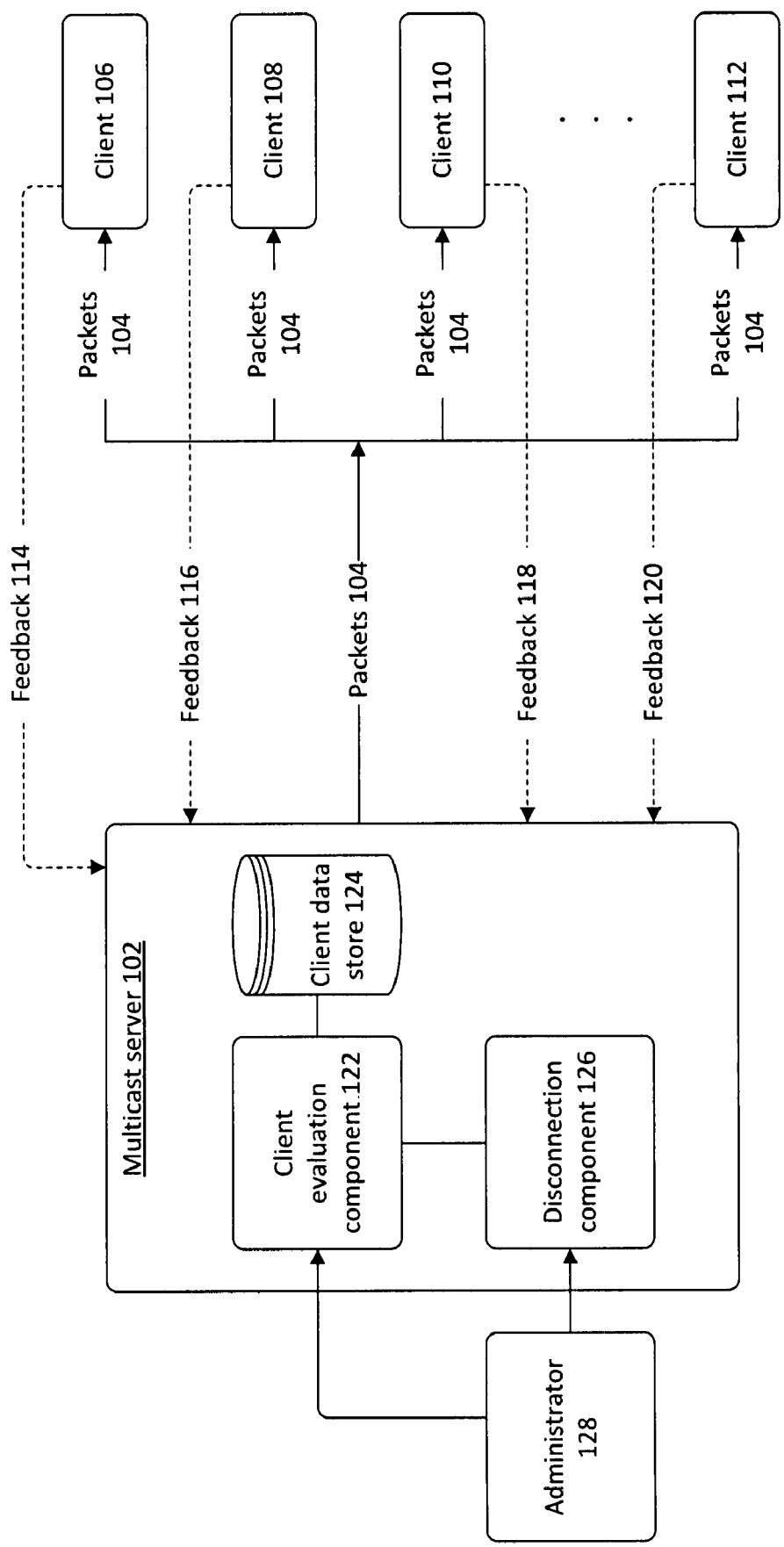
FIG. 1 is a block diagram of an example arrangement in which data is multicast.

FIG. 1 is a block diagram of an arrangement in which a multicast of data may be performed. Multicast server 102 transmits data, in the form of packets 104, to a plurality of clients 106, 108, 110, and 112. It should be understood that the number of clients receiving shown in FIG. 1 (four) is merely an example for purposes of illustration, and that any number of clients may participate in a multicast.

In the multicast being performed in FIG. 1, packets 104 are transmitted to clients 106, 108, 110, and 112 concurrently in a common session. For example, multicast server 102 may write a given packet out to a network once, and copies of that packet are distributed to clients 106, 108, 110, and 112 concurrently in real time.

Multicast server 102 may endeavor to transmit the packets at a rate of speed that allows clients 106, 108, 110, and 112 to receive and handle the packets without loss. For example, the multicast server 102 may endeavor to set the rate of transmission such that the rate of transmission does not exceed the speed of the clients' network interfaces, or so the rate does not exceed the speed at which the clients are able to store the packets. In support of this goal, clients 106, 108, 110, and 112 may send feedback 114, 116, 118, and 120 to multicast server 102. Feedback 114, 116, 118, and 120 indicates how well clients are receiving the packets that are transmitted. For example, the feedback may take the form of acknowledgment messages or negative acknowledgment messages. An acknowledgment message (ACK) is an indication that one or more packets have been received. For example, a client may generate an ACK for each group of n packets in sequence that has been received. A negative acknowledgment message (NACK) indicates that a client would like the server to slow down. Packets may be sequenced (e.g., assigned sequence numbers). Typical communication protocols do not guarantee that packets are received in the same sequence that they are sent, so a gap may not necessarily indicate a dropped packet. However, a client may employ various algorithms to determine when it may be missing packets and should send a NACK. For example, a client may send a NACK if a certain number of unresolved gaps in the sequence of packets occurs, or if gaps occur at a certain frequency, or if gaps remain unresolved for a particular length of time, etc.

Multicast server 102 may comprise, or may otherwise employ, a client evaluation component 122 to assess the various clients' speed (or other performance characteristics) in receiving the multicast transmission. Client evaluation component 122 may consider the current or historical feedback 114, 116, 118, and 120 received from the clients, or other factors, in assessing the performance of the clients. Client evaluation component 122 may use the assessment to determine whether a client should be disconnected from a multicast session. Some example criteria that may be taken into account by client evaluation component 122 are discussed below in connection with FIG. 4.

Multicast server 102 may also comprise, or otherwise employ, a client data store 124. As discussed below in connection with FIG. 4, one factor that may be used by client evaluation component 122 in assessing the performance of a client is known historical information about that client. For example, a particular client, or a client associated with a particular user, may be known to have historical speed problems. Moreover, the network or sub-network on which the client is located may be known to have speed problems. This type of data may be stored in client data store 124. Client evaluation component 122 may use the data stored in client data store 124 to predict the performance of a certain client (or clients) and make decisions about whether that client (or clients) should be disconnected from the multicast session.

Multicast server 102 may also comprise, or otherwise employ, a disconnection component 126. Disconnection component 126 comprises software and/or hardware components that can disconnect a client from a multicast session. For example, disconnection component 126 may disconnect a client based on an instruction from client evaluation component 122. As another example, disconnection component 126 may disconnect a client based on an instruction received from an administrator 128. Thus, the disconnection functionality described herein supports disconnection based on both automated assessment of clients, as well as manual disconnection based on a decision made by an administrator. Additionally, administrator 128 can also interact with client evaluation component 122 to specify the policy(ies) that determine(s) whether a client is to be disconnected.

It should be noted that, in the example of FIG. 1, client evaluation component 122, client data store 124, and disconnection component 126 are shown as separate components contained within multicast server 102. However, it should be understood that FIG. 1 depicts an example structure, and that the functionality of any combination of one or more of these components could be together in a single unit. Moreover, the components may be within multicast server 102, or may be located elsewhere.

Figure 2:
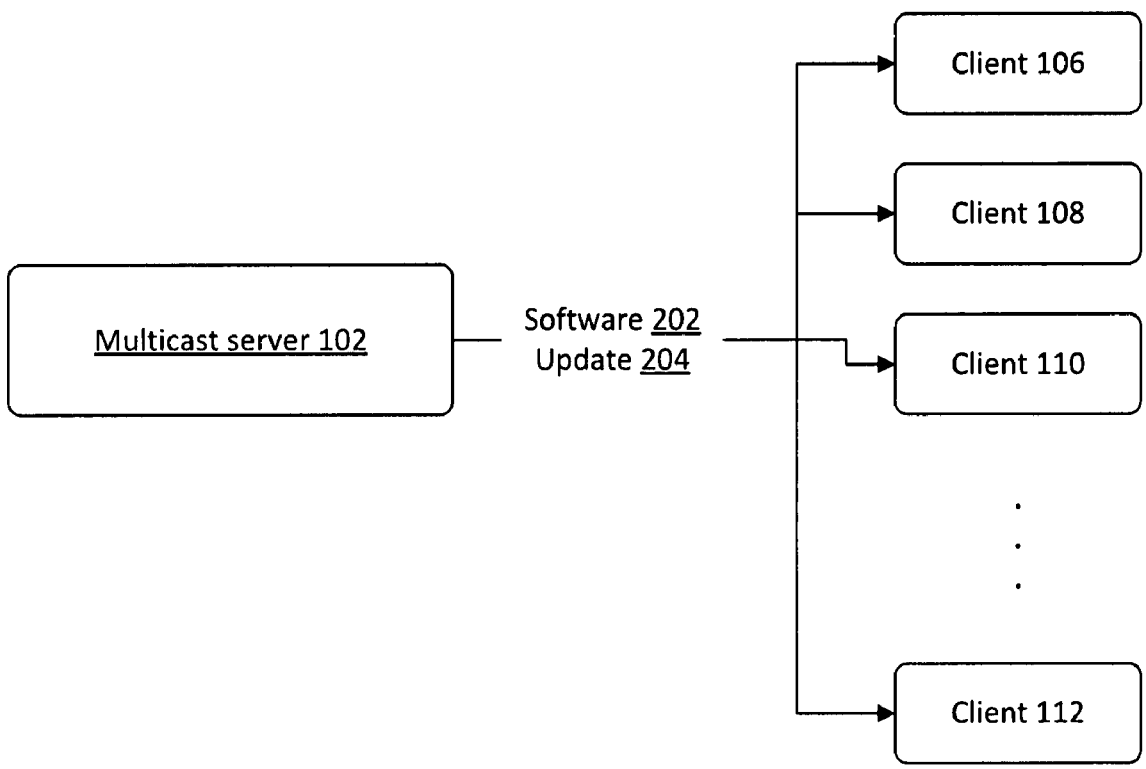
FIG. 2 is a block diagram of a server that multicasts software or a software update to a plurality of clients.

Software is one example of data that may be transmitted in a multicast session, as shown in FIG. 2. In the example of FIG. 2, multicast server 102 transmits software, such as software package 202 and/or software update 204, to clients 106, 108, 110, and 112 in a multicast session. It is often the case that the same software is to be installed on a plurality of machines, which can be accomplished through a multicast. Moreover, the nature of software is such that the unremedied dropping of packets (as may occur in a non-reliable transmission) cannot be tolerated under a particular set of circumstances, and the lost of data contained in the packets can be prevented through reliable multicast. Thus, for example, multicast server 102 may be used to deliver and install an application or system software package, a software update such as a patch or hotfix, etc. However, that the subject matter described herein is not limited to the multicast transmission of software.

It should be noted that FIGS. 1 and 2 show a multicast server transmitting data to a plurality of clients. However, the subject matter described herein is not limited to scenarios that follow a traditional client/server protocol or topology. For example, the concepts described herein may be used in a scenario in which one node transmits data to a plurality of other nodes in a peer-to-peer network.

Example Multicast Process

Figure 3:
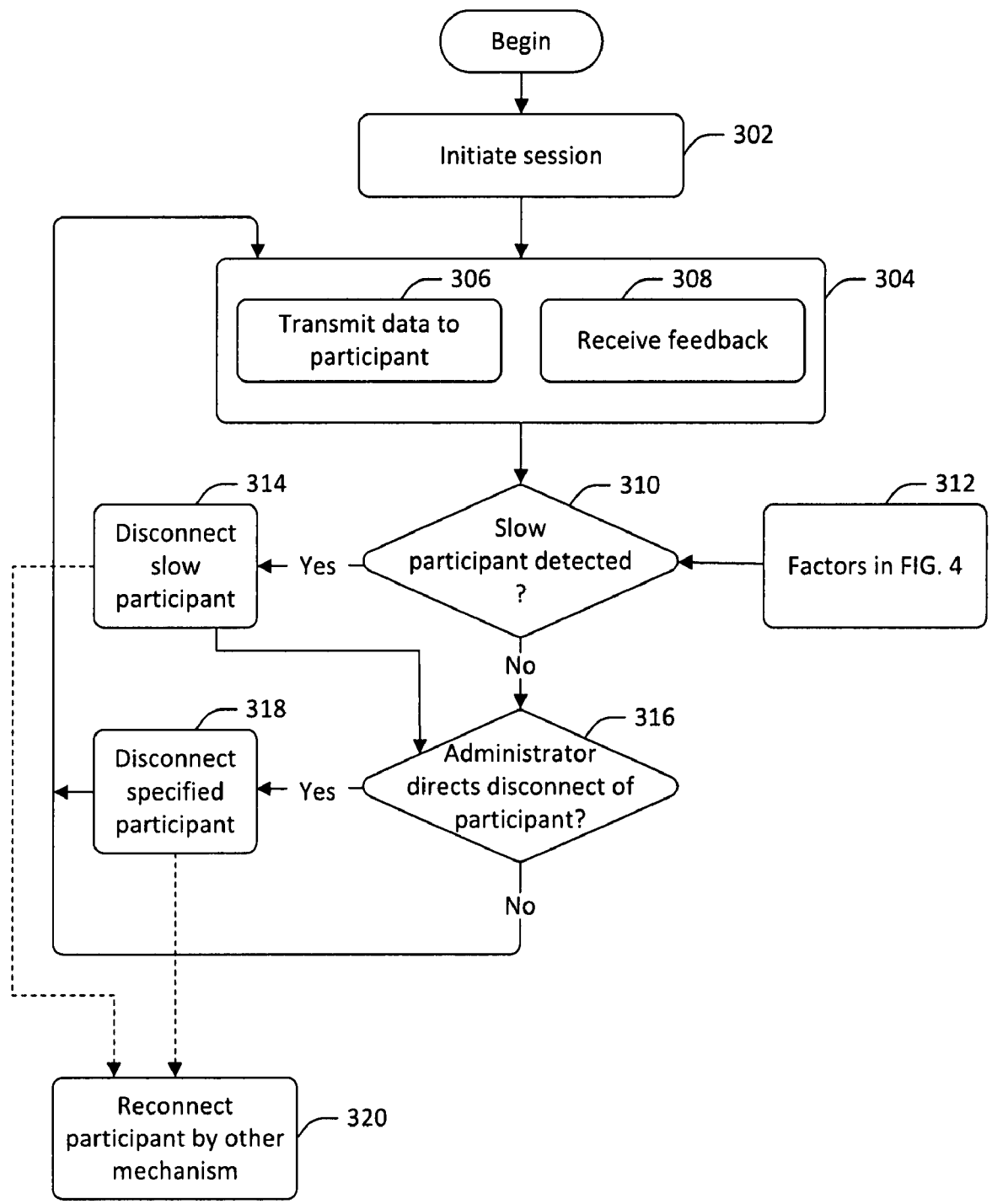
FIG. 3 is a flow diagram of an example process of multicasting with an option to disconnect a client.

FIG. 3 shows an example process of multicasting data, in which a client may be disconnected. The process shown in FIG. 3 may be deployed in the systems shown in FIGS. 1 and 2, but may also be deployed in other systems. Moreover, the lines and arrows between the various blocks in FIG. 3 indicate an example flow from one action to another, but the concepts described in FIG. 3 are not limited to being performed in any particular order, and may also take place concurrently with each other.

At 302, a session is initiated that comprises connections between a multicasting component and participants in the multicast (e.g., connections between multicasting server 102 and clients 106, 108, 110, and 112, shown in FIG. 1).

At 304, the multicasting component transmits data to the participants (306), and also receives feedback from the participants (308). The transmission of data to participants, and the receipt of feedback from those participants, may take place concurrently. For example, a multicasting component may transmit data packets while also receiving ACKs and/or NACKs from the participants. Data about the feedback may be maintained, and this data may be used in evaluating a given client's performance, or other aspects of the client.

As discussed above in connection with FIG. 1, clients (or other participants) in a multicast session are evaluated to assess their performance (e.g., speed) in receiving the data that is being multicast. In addition to evaluating clients for speed, the clients may also be evaluated on various other criteria, such as processor utilization, memory pressure, network utilization, etc. This evaluation is performed based on various factors that are discussed in greater detail in connection with FIG. 4 (as indicated by block 312). If this performance evaluation indicates that a slow participant is detected (at 310), then the slow participant (or a participant identified for other reasons) may be disconnected 314. Moreover, if an administrator (or other relevant user or operator) directs that a particular participant is to be disconnected (at 316), then the specified participant is disconnected (at 318). The process continues, throughout the multicast, to transmit data and receive feedback, to evaluate and detect slow participants (or other participants), and to be ready to receive an administrator's instruction to disconnect a particular participant.

If a participant is disconnected (e.g., at block 314 or 318), then the entire transmission to the participant may be aborted. As an alternative to aborting the transmission, another option is to attempt to reconnect the participant by some other mechanism (at 320). For example, the multicasting component may have another way to transmit data to the participant (e.g., a unicast), such that the participant could receive the data transmission without slowing down other participants in the multicast session.

Example Considerations for Selecting Participant to Disconnect

Figure 4:
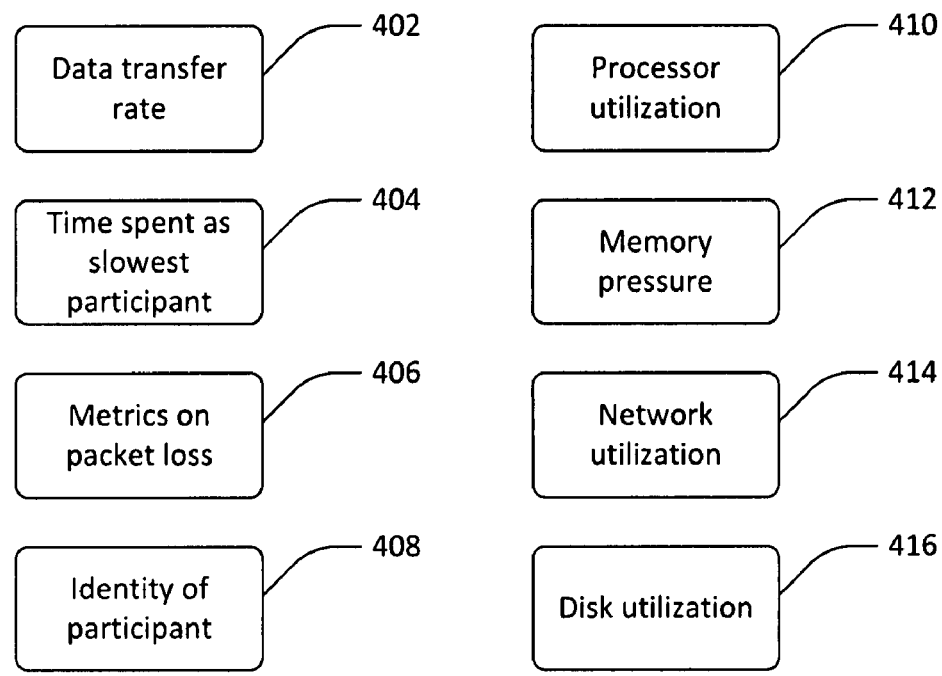
FIG. 4 is a block diagram of criteria that may be taken into account in detecting and/or identifying a client that may be a candidate for disconnection.

As noted above, the performance of participants in a multicast session is evaluated to detect a slow participant (or other participant) as a candidate for disconnection. FIG. 4 shows example considerations that may be taken into account in determining the performance of the participants, or in otherwise identifying participants as candidates for disconnection. The considerations shown in FIG. 4 may, for example, be used by client evaluation component 122 (shown in FIG. 1) and/or as the factors used to detect a slow participant (see block 312 in FIG. 3).

One factor that may be considered (402) is the data transfer rate of a participant. For example, if data is being transmitted on a 100 Mbit/sec channel, then one might expect the transfer of data to happen at a certain rate. If a participant is receiving data significantly below the expected rate, the participant may be identified as slow. One way to determine a participant's data transfer rate is to monitor the feedback from that participant—e.g., by counting the number of ACKs and/or NACKs received, and also monitoring changes (or the absence thereof) in the participant's performance over time. For example, factor 402 may take into consideration:

The number of NACKs received from the participant.

How frequently NACKs are received from the participant.

Over what duration of time NACKs have been received from the participant (e.g., how long it has been since the first NACK was received).

The items in the list are example considerations that can be used to assess the participant's data transfer rate. Based on these factors, a disconnection policy may, for example, state that if the participant's data transfer rate drops below a certain point (or remains below a point for a certain period of time), then the participant is disconnected.

Another factor that may be considered (404) is the time spent as the slowest participant in the session. For example, a policy could state that a participant is to be disconnected if that participant has been the slowest participant in the session for the last hour, or if the participant has spent more time in the session as the slowest participant than any other participant, etc.

Another factor that may be considered (406) is a metric based on packet loss. For example, a policy may state that a participant is to be disconnected if, for example, 70 NACKs have been received from the participant per 100 packets transmitted.

Another factor that may be considered (408) is the identity of the participant. For example, certain machines or users, or machines on certain networks, sub-networks, etc., may be historically associated with a low data transfer rate, and a policy can state that certain participants are to be disconnected based on identity of the participant. A variation on this idea is that certain participants that are historically known to be slow could be allowed to participate in the multicast session, but would be subject to different disconnection policies than other participants—e.g., the policy described above at 406 may disconnect an ordinary participant if the participant generates 70 NACKs per 100 packets, but may also disconnect a historically slow participant if that participant generates 50 NACKs per 100 packets.

Other factors that may be considered are processor utilization (410), memory pressure (412), network utilization (414), disk utilization (416), as well as different factors.

The factors described above may be considered in combination with each other. For example, a policy could call for disconnection based on some combination of one or more of factors 402-416 (e.g., disconnect the participant if both factors 402 and 404 are met, or if any two of factors 402-416 are met, etc.).

Additionally, as noted above in connection with FIG. 1, an administrator (or other user or operator) can adjust the policy that determines disconnection. For example, the administrator could set how many NACKs per 100 packets would justify disconnection (see factor 406 above), or how low the data transfer rate should be before disconnection occurs (see factor 402 above), or could specify a disconnection policy in terms of a combination of disconnection factors (e.g., if the participant's data transfer rate drops below X, and the participant has spent the last Y minutes as the slowest participant, then disconnect).

Example Implementation Scenario

Figure 5:
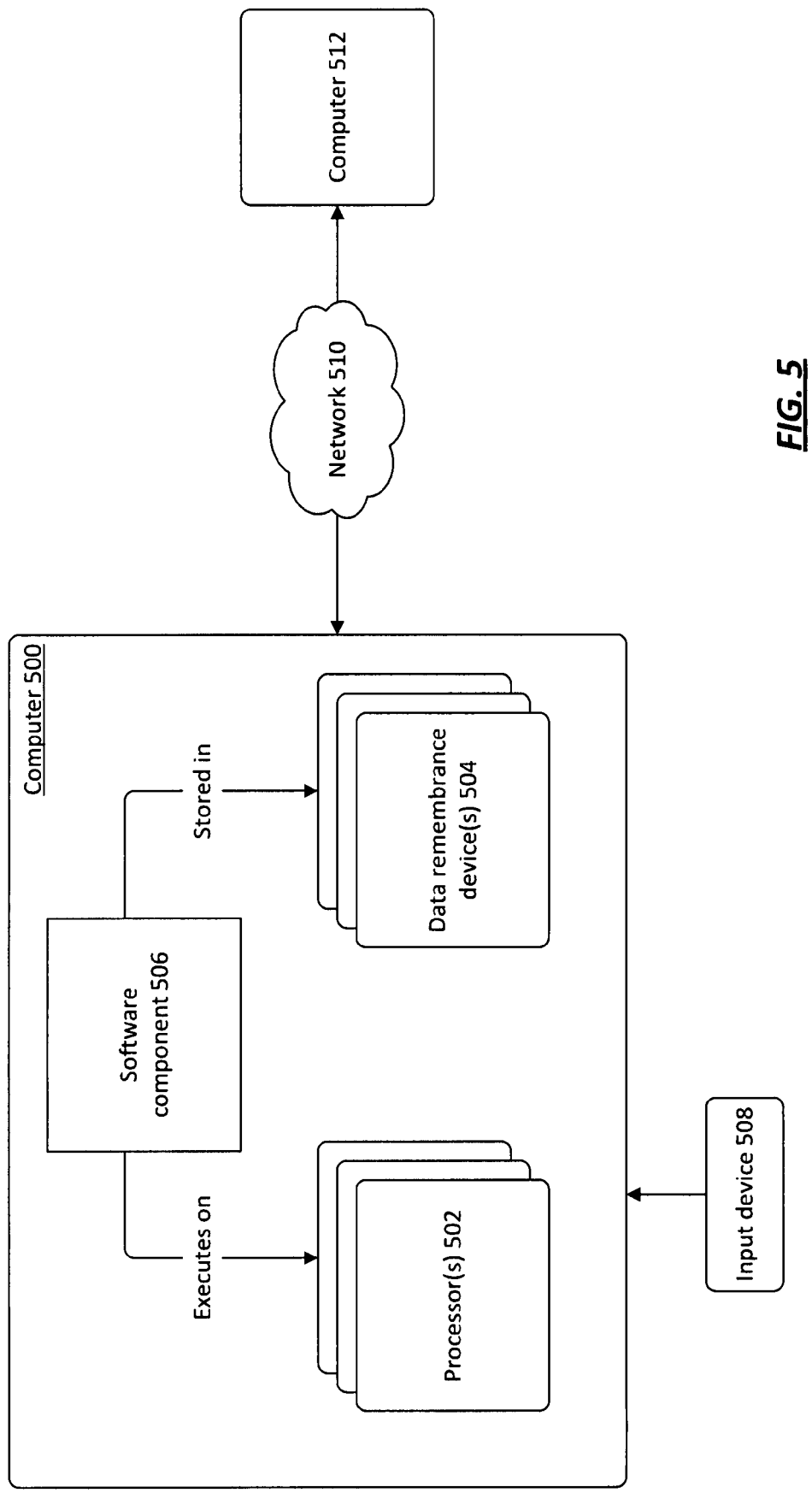
FIG. 5 is a block diagram of an example computing arrangement in which one of more aspects of the subject matter described herein may be deployed.

FIG. 5 shows an example environment in which aspects of the subject matter described herein may be deployed.

Computer 500 includes one or more processors 502 and one or more data remembrance devices 504. Processor(s) 502 are typically microprocessors, such as those found in a personal desktop or laptop computer, a server, or a handheld computer. Data remembrance device(s) 504 are devices that are capable of storing data for either the short or long term. Examples of data remembrance device(s) 504 include hard disks, removable disks (including optical and magnetic disks), volatile and non-volatile random-access memory (RAM), all types of read-only memory (ROM), flash memory, magnetic tape, etc. Data remembrance device(s) are examples of computer-readable media. Computer-readable media include both storage media such as data remembrance device(s) 504, as well as media that carry data ephemerally, such as electronic, magnetic, or optical signals.

Software (such as software component 506) may be stored in the data remembrance device(s) 504, and may execute on the one or more processor(s) 502. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance device(s) 504 and that executes on one or more of the processor(s) 502. As another example, the subject matter can be implemented as software having instructions to perform one or more acts, where the instructions are stored or carried on one or more computer-readable media.

Computer 500 may have an input device 508 (e.g., a keyboard, mouse, etc.) associated therewith, through which a user or other operator may provide input to computer 500. For example, input device 508 may be used by an administrator, user, or other operator to specify that a participant is to be disconnected, or to specify a disconnection policy, as described above.

Additionally, in a typical environment, computer 500 may be communicatively connected to one or more other devices through network 510. Computer 512, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media comprising executable instructions to perform a method of controlling communication with a plurality of participants, the method comprising:

initiating a multicast communication session that comprises connections with the plurality of participants;

from a multicast provider, concurrently transmitting data to said participants;

receiving feedback from said participants;

identifying one or more specific participants from the plurality of participants that are associated with an historically low data transfer rate;

subjecting the identified one or more specific participants to a disconnection policy that is different from a disconnection policy to which others of the plurality of participants are subjected;

determining, based on said feedback, that a first one of said plurality of participants meets one or more criteria specified in the disconnection policy to which the first one of said participants is subjected; and directing, from said multicast provider, that said first one of said participants be removed from the multicast communication session.

2. The one or more computer-readable storage media of claim 1, wherein said one or more criteria relate to a speed at which said first one of said participants is receiving, or is predicted to receive, said data.

3. The one or more computer-readable storage media of claim 1, wherein said one or more criteria comprise at least one of:

a number of NACKs received;

a number of NACKs received per unit of time, from said first one of said participants; or a duration of time for which NACKs have been received from said first one of said participants.

4. The one or more computer-readable storage media of claim 1, wherein said one or more criteria comprise at least one of: processor utilization, memory pressure, network utilization, or disk utilization.

5. The one or more computer-readable storage media of claim 1, wherein said one or more criteria comprise an amount of time that said first one of said participants has spent as a slowest participant in said session.

6. The one or more computer-readable storage media of claim 1, wherein the method further comprises:

receiving an instruction from an operator to disconnect a second one of said participants; and disconnecting said second one of said participants.

7. The one or more computer-readable storage media of claim 1, further comprising:

after disconnection of said first one of said participants, transmitting at least some of said data to said first one of said participants outside of said multicast communication session.

8. The one or more computer-readable storage media of claim 1, wherein said data comprises software or a software update to be installed at said participants.

9. A system that manages a multicast session, the system comprising:

one or more data remembrance devices;

one or more processors;

a software component that is stored in at least one of said data remembrance devices, that is executable on at least one of said processors, that maintains communication links with each of a plurality of nodes, that concurrently multicasts data packets to said plurality of nodes in the multicast session, that assesses each of said plurality of nodes' performance in receiving said data packets, that subjects each of the plurality of nodes to a disconnection policy dependent upon an historical data transfer rate associated with each of the plurality of nodes, and that disconnects a first node from the multicast session based either on (a) an instruction from an operator of said software component to disconnect said first node, or (b) a finding that said first node's performance meets one or more criteria specified in a disconnection policy, the one or more criteria relating to a speed at which said first node has received, or is predicted to receive, said data packets.

10. The system of claim 9, wherein said software component disconnects said first node from the multicast session based on a finding that said first node's performance meets said one or more criteria, and wherein said one or more criteria comprise at least one of the following:

a number of NACKs received from said first node;

a number of NACKs received, per unit of time, from said first node; and a duration of time for which one or more NACKs have been received from said node.

11. The system of claim 9, wherein said software component disconnects said first node from the multicast session based on a finding that said first node's performance meets said one or more criteria, and wherein said one or more criteria comprise an amount of time that said first node has spent as the slowest recipient of said data packets in the multicast session.

12. The system of claim 9, wherein said software component disconnects said first node from the multicast session based on a finding that said first node's performance meets said one or more criteria, and wherein said one or more criteria comprise a comparison between a number of said data packets that have been sent and a number of NACK's received from said first node.

13. The system of claim 9, wherein after disconnecting the first node from the multicast session, the software component transmits the contents of some or all of said data packets to said first node outside of said multicast session.

14. The system of claim 9, wherein said software component receives a specification of said one or more criteria from said operator.

15. A method of managing communication with a plurality of nodes, the method comprising:

maintaining communication links with each of the plurality of nodes in a multicast session in which data packets are transmitted concurrently to the plurality of nodes;

maintaining, for each of the plurality of nodes, information pertaining to one or more aspects of the plurality of nodes' communication speed;

subjecting each of the plurality of nodes to a disconnection policy, wherein at least one of the plurality of nodes is subjected to a disconnection policy that is different from disconnection policies of others of the plurality of nodes because the at least one of the plurality of nodes is associated with an historically low data transfer rate;

selecting a first node based on a finding that the information pertaining to said first node meets one or more criteria specified in the disconnection policy to which the first node is subjected, the criteria relating to speed of receipt of said data packets; and disconnecting said first node from said communication session.

16. The method of claim 15, further comprising:

after disconnecting said first node, transmitting at least some of the content contained in said data packets to said first node outside of said communication session.

17. The method of claim 15, wherein said one or more criteria comprise one or more of the following:

a number of NACKs received from said first node;

a number of NACKs per unit of time received from said first node; and a duration of time for which NACKs have been received from said first node.

18. The method of claim 15, wherein said one or more criteria comprise whether the amount of time that said first node has spent as a slowest participant in the communication session exceeds a threshold.

19. The method of claim 15, further comprising:

disconnecting a second node based on an instruction, received from an operator, to disconnect said second node.

20. The method of claim 15, further comprising:

setting said one or more criteria based on a specification received from an operator.

* * * * *